US010955940B2

(12) United States Patent
Yin et al.

(10) Patent No.: US 10,955,940 B2
(45) Date of Patent: Mar. 23, 2021

(54) METHOD FOR DETECTING PRESSURE OF ACTIVE PEN, DEVICE AND ACTIVE PEN

(71) Applicant: SHENZHEN GOODIX TECHNOLOGY CO., LTD., Shenzhen (CN)

(72) Inventors: Hailin Yin, Shenzhen (CN); Zhi Yao, Shenzhen (CN); Wenhe Jin, Shenzhen (CN); Yufeng Liu, Shenzhen (CN)

(73) Assignee: SHENZHEN GOODiX TECHNOLOGY GO.. LTD., Shenzhen (CN)

( * ) Notice: Subject to any disclaimer, the term of this patent is extended or adjusted under 35 U.S.C. 154(b) by 0 days.

(21) Appl. No.: 16/457,790

(22) Filed: Jun. 28, 2019

(65) Prior Publication Data
US 2019/0324562 A1 Oct. 24, 2019

Related U.S. Application Data

(63) Continuation of application No. PCT/CN2018/071664, filed on Jan. 5, 2018.

(51) Int. Cl.
*G06F 3/0354* (2013.01)
*G06F 3/038* (2013.01)
*G06F 1/3296* (2019.01)

(52) U.S. Cl.
CPC ........ *G06F 3/03545* (2013.01); *G06F 1/3296* (2013.01); *G06F 3/0383* (2013.01); *G06F 3/03547* (2013.01); *G06F 2203/0384* (2013.01)

(58) Field of Classification Search
CPC .. G06F 3/03545; G06F 3/0441; G06F 3/0442; G06F 2203/04114
See application file for complete search history.

(56) References Cited

U.S. PATENT DOCUMENTS

| 2010/0253639 A1* | 10/2010 | Huang | G06F 3/0412 345/173 |
| 2011/0221701 A1* | 9/2011 | Zhang | G06F 3/044 345/174 |

(Continued)

FOREIGN PATENT DOCUMENTS

| CN | 201392511 Y | 1/2010 |
| CN | 202815746 U | 3/2013 |

(Continued)

OTHER PUBLICATIONS

The extended European Search Report of corresponding European application No. 18 89 3325, dated Oct. 30, 2019.

(Continued)

*Primary Examiner* — Dong Hui Liang
(74) *Attorney, Agent, or Firm* — J.C. Patents

(57) ABSTRACT

Provided are a method for detecting a pressure of an active pen, a device and an active pen, where a pen body of the active pen is provided with a touch sensor. The method includes: obtaining a sensing change amount of the touch sensor, where the sensing change amount indicates a capacitance change amount of the touch sensor; and determining, according to the sensing change amount, a pressure value on the pen body. The technical solution provided by the disclosure can reduce the cost of the active pen while realizing the pressure detection for the active pen.

20 Claims, 7 Drawing Sheets

(56) References Cited

U.S. PATENT DOCUMENTS

| | | | | |
|---|---|---|---|---|
| 2014/0168093 A1* | 6/2014 | Lawrence | ............... | G06F 3/016 345/173 |
| 2014/0368474 A1* | 12/2014 | Kim | ..................... | A61B 5/1122 345/179 |
| 2016/0179222 A1* | 6/2016 | Chang | ................... | G06F 3/0383 345/179 |
| 2017/0108953 A1 | 4/2017 | Mao et al. | | |

FOREIGN PATENT DOCUMENTS

| | | | |
|---|---|---|---|
| CN | 106095174 | A | 11/2016 |
| CN | 106293152 | A | 1/2017 |
| CN | 106293220 | A | 1/2017 |
| EP | 2 813 918 | A1 | 12/2014 |
| WO | 2015/191409 | A1 | 12/2015 |

OTHER PUBLICATIONS

The Chinese International Search Report of corresponding international application No. PCT/CN2018/071664, dated Oct. 10, 2018.

\* cited by examiner

METHOD FOR DETECTING PRESSURE OF ACTIVE PEN, DEVICE AND ACTIVE PEN

CROSS-REFERENCE TO RELATED APPLICATION

This application is a continuation of International Application No. PCT/CN2018/071664 filed on Jan. 5, 2018, the content of which is incorporated herein by reference in its entirety.

TECHNICAL FIELD

The present disclosure relates to the field of touch sensing technologies and, more particularly, to a method for detecting a pressure of an active pen, a device and an active pen.

BACKGROUND

With the rapid development of touch technologies and mobile terminal technologies, touch screens are used on more and more mobile terminals for human-machine interaction. In addition to accepting touch operations conducted directly by a finger, a touch screen can also support touch input operations through a stylus. The stylus is more and more widely used on touch screens because of its advantages, for example, in accurate and fast writing on smaller touch screens.

Currently, styluses for touch screens mainly include passive pens and active pens. The role of a passive pen is equivalent to a finger of a person. When the passive pen touches a touch screen, the electrode capacitance at the touch point can be changed, and the position of the touch point can be determined through detecting the change in the electrode capacitance by a touch chip of the touch screen. For achieving sufficient sensitivity, the nib of the passive pen is often very thick, and the passive pen cannot express the thickness of handwriting. An active pen can emit an excitation signal to change the electric field at the touch point, thereby changing the electrode capacitance at the touch point, and the position of the touch point can be determined through detecting the change in the electrode capacitance by the touch chip of the touch screen. Since the active pen can actively emit an excitation signal, the nib of the active pen can be designed to be very thin, and the active pen can emit signals representing different writing strength of a user to the touch screen by sensing the writing strength of the user, so that the touch screen displays the thickness of the handwriting.

In the prior art, an active pen senses the writing strength of a user mainly through a pressure sensing principle, that is, a pressure sensor is provided in the nib of the active pen, through which a pressure on the active pen under different writing strength from the user can be sensed. Pressure signals representing different writing strength of the user are transmitted to the touch screen to make the touch screen display the thickness of the handwriting. However, such active pen has a higher requirement for the material of the nib, and the cost of the pressure sensor itself is also relatively high, resulting in a high cost of the active pen.

SUMMARY

In view of these, the present disclosure provides a method for detecting a pressure of an active pen, a device and an active pen, for reducing the cost of the active pen.

In order to achieve the above purpose, in a first aspect, the present disclosure provides a method for detecting a pressure of an active pen, a pen body of the active pen being provided with a touch sensor, where the method includes:

obtaining a sensing change amount of the touch sensor, where the sensing change amount is used to indicate a capacitance change amount of the touch sensor; and determining, according to the sensing change amount, a pressure value received by the pen body.

By using the principle that the contact area between a hand and a pen is positively correlated with the strength when the hand holds the pen, a sensing change amount of the touch sensor in the pen body is obtained, and a pressure value on the pen body is determined according to the sensing change amount, thus enabling reduction of the cost of the active pen while realizing pressure detection for the active pen.

As an optional implementation of the embodiment of the present disclosure, the obtaining a sensing change amount of the touch sensor includes:

obtaining a reference sensing value of the touch sensor, where the reference sensing value is amplitude of a voltage signal fed back by the touch sensor in response to a reference voltage signal applied thereon when the pen body is free of pressure;

obtaining a current sensing value of the touch sensor, where the current sensing value is amplitude of a voltage signal fed back by the touch sensor in response to the reference voltage signal applied thereon at a current time; and obtaining a difference between the reference sensing value and the current sensing value as the sensing change amount of the touch sensor.

By applying a constant reference voltage signal to the touch sensor to obtain the reference sensing value and the current sensing value of the touch sensor to obtain the sensing change amount of the touch sensor, accuracy of the pressure detection result can be improved.

As an optional implementation of the embodiment of the present disclosure, the obtaining a reference sensing value of the touch sensor includes:

obtaining a pre-stored reference sensing value of the touch sensor.

By obtaining the pre-stored reference sensing value of the touch sensor, processing flow on a processor can be reduced.

As an optional implementation of the embodiment of the present disclosure, the method further includes:

updating the pre-stored reference sensing value of the touch sensor when the active pen is powered on or sleeping.

By updating the pre-stored reference sensing value of the touch sensor, accuracy of the pressure detection result can be improved.

As an optional implementation of the embodiment of the present disclosure, the updating the pre-stored reference sensing value of the touch sensor includes:

obtaining the current sensing value of the touch sensor; and updating the pre-stored reference sensing value of the touch sensor with the current sensing value when an absolute value of a difference between the current sensing value and the pre-stored reference sensing value is smaller than a preset sensing threshold.

As an optional implementation of the embodiment of the present disclosure, there are a plurality of touch sensors, and the obtaining the current sensing value of the touch sensor includes:

scanning each of the touch sensors sequentially using the reference voltage signal, and obtaining amplitude of a voltage signal fed back by each of the touch sensors.

As an optional implementation of the embodiment of the present disclosure, there are a plurality of touch sensors, and the obtaining a sensing change amount of the touch sensor includes:

obtaining the sensing change amount of each of the touch sensors separately.

By obtaining reference sensing values of the plurality of touch sensors in the pen body and determining the pressure value on the pen body according to a plurality of sensing change amounts, sensitivity of the pressure detection of the active pen can be improved.

As an optional implementation of the embodiment of the present disclosure, the determining, according to the sensing change amount, a pressure value in the pen body specifically includes:

calculating a sum of sensing change amounts of the touch sensors;

determining whether the sum of the sensing change amounts is greater than zero; and determining the pressure value on the pen body according to the sensing change amounts and a preset mapping relationship if the sum of the sensing change amounts is greater than zero, where the mapping relationship includes mapping information between the pressure value and the sensing change amounts of the touch sensors.

By firstly calculating the sum of the sensing change amounts of each of the touch sensors and then determining the pressure value on the pen body according to the sensing change amounts and a preset mapping relationship if the sum of the sensing change amount is greater than zero, table look-up operations can be reduced, and processing efficiency of the processor can be improved.

As an optional implementation of the embodiment of the present disclosure, the method further includes:

transmitting the pressure value to a touch terminal wirelessly.

By transmitting the pressure value to a touch terminal wirelessly, the pressure detection of the active pen can thus be realized in a wireless active pen, preventing the nib of the wireless active pen from scratching a touch screen when writing on the touch screen of the touch terminal.

As an optional implementation of the embodiment of the present disclosure, the method further includes:

controlling the active pen to enter a sleep-low-power state when a duration of the pressure value being smaller than a first pressure threshold is greater than a preset time threshold; and waking up the active pen from the sleep-low-power state to a normal working state when the pressure value is greater than a second pressure threshold.

By controlling the active pen to switch between the sleep-low-power state and the normal working state, the power consumption of the active pen can be reduced, and the battery life of the active pen can be extended.

In a second aspect, an embodiment of the present disclosure provides a device for detecting a pressure of an active pen, where a pen body of the active pen is provided with a touch sensor, and the device includes:

an obtaining module, configured to obtain a sensing change amount of the touch sensor, where the sensing change amount is used to indicate a capacitance change amount of the touch sensor; and a determining module, configured to determine, according to the sensing change amount obtained by the obtaining module, a pressure value received by the pen body.

As an optional implementation of the embodiment of the present disclosure, the obtaining module includes:

a first obtaining unit, configured to obtain a reference sensing value of the touch sensor, where the reference sensing value is amplitude of a voltage signal fed back by the touch sensor in response to a reference voltage signal applied thereon when the pen body is free of pressure;

a second obtaining unit, configured to obtain a current sensing value of the touch sensor, where the current sensing value is amplitude of a voltage signal fed back by the touch sensor in response to the reference voltage signal applied thereon at a current time; and a first determining unit, configured to obtain a difference between the reference sensing value obtained by the first obtaining unit and the current sensing value obtained by the second obtaining unit as the sensing change amount of the touch sensor.

As an optional implementation of the embodiment of the present disclosure, the device further includes: a storage module, configured to pre-store a reference sensing value of the touch sensor; and the first obtaining unit is specifically configured to:

obtain the reference sensing value of the touch sensor pre-stored in the storage module.

As an optional implementation of the embodiment of the present disclosure, the device further includes:

an updating module, configured to update the reference sensing value of the touch sensor pre-stored in the storage module when the active pen is powered on or sleeping.

As an optional implementation of the embodiment of the present disclosure, the updating module includes:

a third obtaining unit, configured to obtain the current sensing value of the touch sensor; and an updating unit, configured to update the reference sensing value of the touch sensor pre-stored in the storage module with the current sensing value when an absolute value of the difference between the current sensing value obtained by the third obtaining unit and the reference sensing value pre-stored in the storage module is smaller than a preset sensing threshold.

As an optional implementation of the embodiment of the present disclosure, there are a plurality of touch sensors, and the second obtaining unit is specifically configured to:

scan each of the touch sensors sequentially using the reference voltage signal, and obtain amplitude of a voltage signal fed back by each of the touch sensors.

As an optional implementation of the embodiment of the present disclosure, there are a plurality of touch sensors, and the obtaining module is specifically configured to:

obtain the sensing change amount of each of the touch sensors separately.

As an optional implementation of the embodiment of the present disclosure, the determining module includes:

a calculating unit, configured to calculate a sum of sensing change amounts of the touch sensors;

a determining unit, configured to determine whether the sum of the sensing change amounts as calculated by the calculating unit is greater than zero; and a second determining unit, configured to determine the pressure value on the pen body according to the sensing change amounts and a preset mapping relationship if the determining unit determines that the sum of the sensing change amounts is greater than zero, where the mapping relationship includes mapping information between the pressure value and the sensing change amounts of the touch sensors.

As an optional implementation of the embodiment of the present disclosure, the device further includes:

a radio module, configured to transmit the pressure value determined by the determining module to a touch terminal wirelessly.

As an optional implementation of the embodiment of the present disclosure, the device further includes:

a state controlling module, configured to control the active pen to enter a sleep-low-power state when the determining module determines that a duration of the pressure value being smaller than a first pressure threshold is greater than a preset time threshold; and wake up the active pen from the sleep-low-power state to a normal working state when the determining module determines that the pressure value is greater than a second pressure threshold.

For the beneficial effects of the devices provided by the above second aspect and various possible implementations thereof, reference may be made to the beneficial effects introduced by the first aspect and various possible implementations thereof, which will not be repeated herein.

In a third aspect, an embodiment of the present disclosure provides an active pen including a pen body and a nib, where the pen body is provided with a touch sensor, and the active pen further includes: a memory and a processor, where:

the memory is configured to store executable instructions; and the processor is configured to implement the method according to any one of the implementations of the first aspect when executing the executable instructions.

As an optional implementation of the embodiment of the present disclosure, there are a plurality of touch sensors, and the plurality of the touch sensors are located at an end of the pen body near the nib, and are axially spaced along the pen body.

As an optional implementation of the embodiment of the present disclosure, the active pen further includes: a radio circuit which is electrically connected to the processor for transmitting the pressure value to a touch terminal wirelessly according to an instruction by the processor.

As an optional implementation of the embodiment of the present disclosure, the touch sensor is a ring electrode which is disposed coaxially with the pen body.

For the beneficial effects of the active pen provided by the above third aspect and various possible implementations thereof, reference may be made to the beneficial effects introduced by the first aspect and various possible implementations thereof, which will not be repeated herein.

In a fourth aspect, an embodiment of the present disclosure provides a touch input system, including: a touch terminal and the active pen according to any one of the implementations of the third aspect.

For the beneficial effects of the touch input system provided by the above fourth aspect and various possible implementations thereof, reference may be made to the beneficial effects introduced by the third aspect and various possible implementations thereof, which will not be repeated herein.

In a fifth aspect, an embodiment of the present disclosure provides a computer readable storage medium having a computer program stored thereon which, when being executed by the processor, implements the method according to any one of the implementations of the first aspect when executed by the processor.

For the beneficial effects of the devices provided by the above fifth aspect and various possible implementations thereof, reference may be made to the beneficial effects introduced by the first aspect and various possible implementations thereof, which will not be repeated herein.

DETAILED DESCRIPTION OF THE EMBODIMENTS

In order to solve the technical problem that the cost of an existing active pen is very high due to the use of a pressure sensor for detecting the pressure, embodiments of the present disclosure provide a method for detecting a pressure of an active pen, a device and an active pen. A touch sensor is provided in a pen body of the active pen. By obtaining a sensing change amount of the touch sensor and determine a pressure value on the pen body according to the sensing change amount, the purpose of reducing the cost of the active pen while realizing the pressure detection for the active pen is achieved.

The technical solutions of the present disclosure will be described in detail below with reference to the accompanying drawings.

Figure 1:
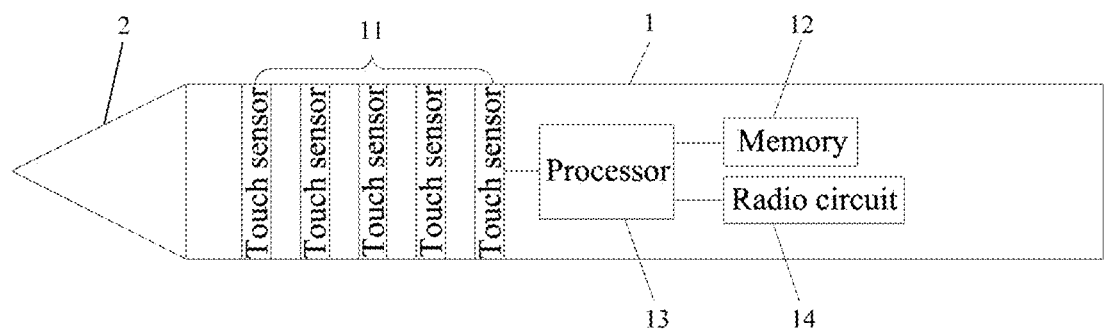
FIG. 1 is a schematic physical structural diagram of an active pen according to an embodiment of the present disclosure.

FIG. 1 is a schematic physical structural diagram of an active pen according to an embodiment of the present disclosure. As shown in FIG. 1, the active pen of this embodiment of the present disclosure includes a pen body 1 and a nib 2, where the pen body 1 is provided with a touch sensor 11. The active pen further includes: a memory 12 and a processor 13, where the memory 12 is configured to store executable instructions, the processor 13 is configured to implement the method for detecting a pressure of an active pen according to an embodiment of the present disclosure when executing the executable instructions (for details, refer to the following method embodiments).

Specifically, when a user holds the pen body 1 for writing, a harder grip means larger contact area between the hand and the pen, leading to larger capacitance change amount of the touch sensor 11. Conversely, a lighter grip means smaller contact area between the hand and the pen, leading to smaller capacitance change amount of the touch sensor 11. According to this principle, the processor 13 can collect a sensing change amount reflecting the capacitance change amount to determine the pressure applied onto the pen body 1 according to the sensing change amount of the touch sensor 11, and transmit a corresponding pressure value to a touch terminal, so that the touch terminal can display the thickness of the handwriting according to the pressure value.

The touch sensor 11 can be one or more. Using different numbers of touch sensors 11, the active pen can reach different pressure detection sensitivities. That is, more touch sensors 11 can introduce higher pressure detection sensitivity for the active pen, and correspondingly, more data for the processor 13 to process. In a specific implementation, an appropriate number of touch sensors 11 can be selected according to a pressure detection sensitivity and processing speed as needed, which will not be particularly limited in this embodiment.

When the touch sensor 11 is more than one, a plurality of touch sensors 11 may be disposed at an end of the pen body 1 near the nib 2, and are axially spaced along the pen body 1, to ensure that the user can touch the touch sensors 11 as much as possible when using the pen, thereby improving the sensitivity of the pressure detection.

In a specific implementation, the touch sensor 11 may be a ring electrode. The ring electrode may be disposed coaxially with the pen body 1, so as to maximize the contact area between the finger and the touch sensor 11 when the user uses the pen. Specifically, the ring electrode can be implemented using a metal foil.

Hereinafter, the relationship between the pen-gripping strength of the user and the contact area of the touch sensor 11 will be explained by taking five ring electrodes (touch sensors 11) as an example.

Figure 2:
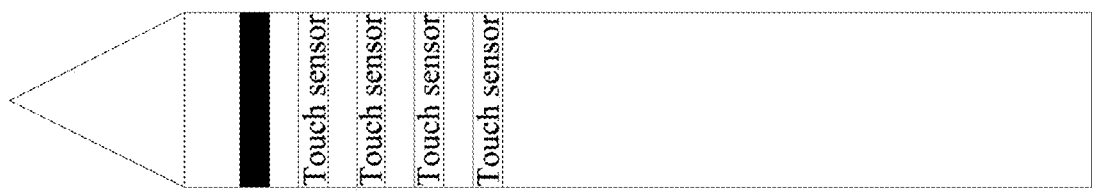
FIG. 2 shows a contact case between a hand and a touch sensor when a pen is held with a light grip.
Figure 3:
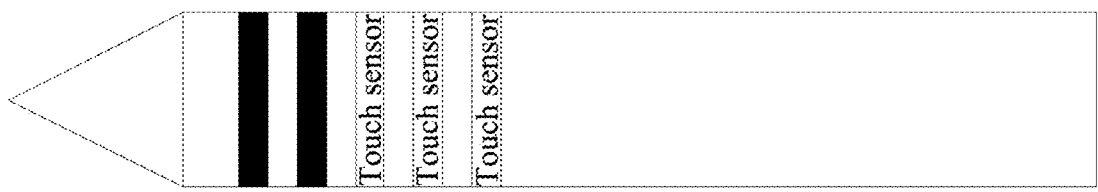
FIG. 3 shows a contact case between a hand and a touch sensor when a pen is held with a medium grip.
Figure 4:
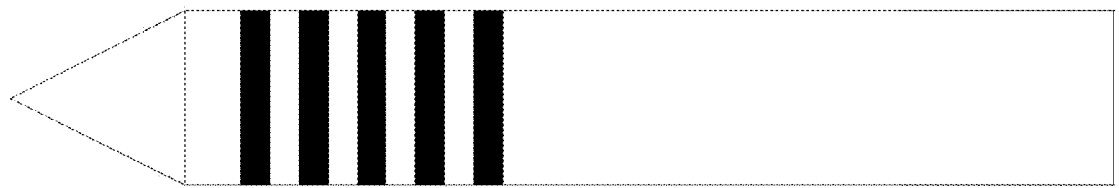
FIG. 4 shows a contact case between a hand and a touch sensor when a pen is held with a hard grip.

FIG. 2 to FIG. 4 show the contact cases between a hand and the touch sensors when the pen is held with grips of different strength, respectively, where FIG. 2 shows a contact case between a hand and a touch sensor when a pen is held with a light grip, FIG. 3 shows a contact case between a hand and a touch sensor when a pen is held with a medium grip, and FIG. 4 shows a contact case between a hand and a touch sensor when a pen is held with a hard grip. In these figures, a black box represents the touch sensor 11 that is in contact with the hand, and a white box represents the touch sensor 11 that is not in contact with the hand.

Specifically, the harder the user holds the pen, the larger the contact area between the hand and the pen body 1 is, thus more touch sensors 11 are in contact with the hand, and the sum of the capacitance change amounts of the touch sensors 11 is larger. Correspondingly, the total sensing change amount of the touch sensors 11 obtained by the processor 13 is larger. As shown in FIG. 2, when the user holds the pen with a light grip, the hand touches one touch sensor 11, and the total sensing change amount obtained by the processor 13 is smaller. As shown in FIG. 3, when the user holds the pen with a medium grip, the hand touches two touch sensors 11, and the total sensing change amount obtained by the processor 13 becomes larger. As shown in FIG. 4, when the user holds the pen with a hard grip, the hand touches five touch sensors 11, and the total sensing change amount obtained by the processor 13 reaches maximum.

Figure 5:
FIG. 5 shows a contact case between a hand and a single touch sensor when a pen is held with a light grip.
Figure 6:
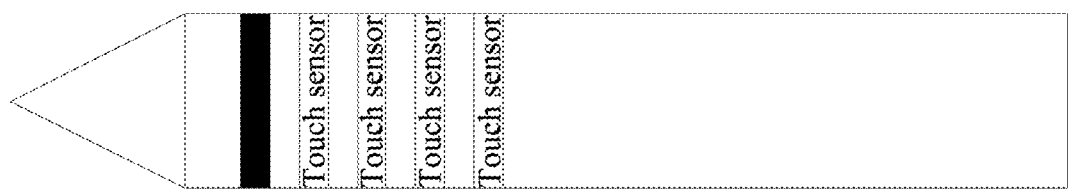
FIG. 6 shows a contact case between a hand and a single touch sensor when a pen is held with a hard grip.

FIG. 5 and FIG. 6 show the contact cases between a hand and a single touch sensor when the pen is held with grips of different strength, respectively, where FIG. 5 shows a contact case between a hand and a single touch sensor when a pen is held with a light grip, and FIG. 6 shows a contact case between a hand and a single touch sensor when a pen is held with a hard grip. In these figures, a black box represents that the contact area between the hand and the touch sensor 11 is larger, and a light gray box represents that the contact area between the hand and the touch sensor 11 is smaller. In the figures, the first touch sensor 11 closest to the nib 2 is taken as an example to illustrate the contact cases of the hand with the single touch sensor 11, and other four touch sensors 11 are represented by white boxes.

Specifically, the harder the user holds the pen, the tighter the contact between the hand and the pen body 1 is, leading to larger contact area between the hand and the touch sensor 11, and thus larger capacitance change amount in the single touch sensor 11. Correspondingly, the sensing change amount of the touch sensor 11 obtained by the processor 13 is larger. As shown in FIG. 5, when the user holds the pen with a light grip, the contact area between the hand and the touch sensor 11 is smaller, and the sensing change amount obtained by the processor 13 is smaller as well. As shown in FIG. 6, when the user holds the pen with a hard grip, the contact area between the hand and the touch sensor 11 is larger, and the sensing change amount obtained by the processor 13 is larger as well.

That is to say, the harder the user holds the pen, the larger the contact area between the hand and the touch sensors 11 is, and the total sensing change amount of the touch sensors 11 obtained by the processor 13 is larger. That is, the total sensing change amount is positively correlated with the pressure received by the pen body 1, and the processor 13 can determine the pressure value of the corresponding pen body 1 according to the sensing change amounts obtained by the processor 13.

It should be noted that the number of the touch sensors 11 touched by the hand a pen is held with different strength of grips in FIG. 2 to FIG. 4 above is only an example, but not intended to limit the present disclosure. In addition, the touch between the hand and the touch sensor 11 as described above is indirect contact in that the hand is actually in direct contact with the outer wall of the pen body 1 facing the touch sensor 11. In order to simplify the drawings, only the touch sensors 11 in the active pen are shown in FIG. 2 to FIG. 6, and other structures of the active pen are not shown.

In this embodiment, when collecting the sensing change amount of the touch sensor 11, the processor 13 may specifically collect the charge-discharge duration of the touch sensor 11, and may also collect amplitude of a voltage signal fed back by the touch sensor 11, and may also collect other information of the touch sensor 11 that can reflect the capacitance change amount.

The method for collecting the amplitude of the voltage signal fed back by the touch sensor 11 is implemented primarily as follows. A reference voltage signal is applied to the touch sensor 11 through a coding circuit (also referred to as a driving circuit), where the reference voltage signal may be an oscillating signal such as a square wave, a sine wave or a triangular wave at a certain frequency and amplitude. The inherent capacitance of the touch sensor 11 is charged and discharged under the action of the reference voltage signal, and the charge stored on the touch sensor 11 can be converted into a voltage signal by an integrating circuit. The voltage signal is then output to an analog-to-digital converter (ADC), through which the analog voltage signal is converted into a digital signal and output to the processor 13. When the touch sensor 11 is touched by the user, the capacitance of the touch sensor 11 changes, and the touch sensor 11 absorbs some voltage. Thus, the amplitude of the voltage signal obtained by the processor 13 drops. Then the processor 13 determines the corresponding capacitance change amount from the change amount of the amplitude, and then determines the corresponding strength information. The coding circuit, the integration circuit and the ADC may be separate circuit modules, or be integrated in the processor 13.

In the above method for collecting the amplitude of the voltage signal fed back by the touch sensor 11, a constant reference voltage signal is adopted, thus the interference is smaller, the collected result is more stable and reliable, and the pressure detection result is more accurate. In addition, in order to improve the sensitivity of the pressure detection result, when collecting the amplitude of the voltage signal fed back by the touch sensor 11, a pair of coding circuits and integration circuits can be used to obtain a collected result of double voltage amplitude.

In this embodiment, the active pen may further include: a radio circuit 14 which is electrically connected to the processor 13 and configured to transmit a pressure value to the touch terminal wirelessly according to an instruction of the processor 13.

Specifically, the radio circuit 14 may include components such as a transceiver and an antenna, where the transceiver transmits and/or receives a wireless signal through the antenna. The wireless signal may be a Bluetooth signal, a Wireless-Fidelity (WiFi) signal, a near field communication signal, or other wireless signal.

The active pen in this embodiment may be a wired active pen (the nib of the active pen contacts the touch terminal to send the excitation signal, and the touch terminal recognizes track data), or may be a wireless active pen (the track data of the active pen is transmitted to the touch terminal wirelessly). When the active pen is a wireless active pen, the pressure value is transmitted to the touch terminal wirelessly, which can prevent the nib of the active pen from scratching the touch screen when writing on the touch screen of the touch terminal.

In addition, in this embodiment, the touch sensor 11 may also be used as a function key. For example, the touch sensor 11 can implement functions of controlling the color and the line type of the handwriting, controlling the nib to be an eraser, controlling the brightness of the screen, controlling the screen to scroll up or down, or controlling the screen zoom, etc. When there are a plurality of touch sensors 11, some or all of them may be selected to implement the function keys, with each of the selected touch sensors 11 implementing one function.

In a specific implementation, the processor 13 can process the sensing change amount of the touch sensor 11 in a time-division manner in each detection cycle to implement the pressure detecting function and the function key function of the touch sensor 11. For example, the processor 13 cyclically detects the touch sensor 11 in a set detection cycle. In each detection cycle, the function key detection may be performed first, which is determining whether the function key corresponding to the touch sensor 11 is pressed according to the sensing change amount of the touch sensor 11; then the pressure detection is performed, which is determining the pressure value on the pen body 1 according to the sensing change amount of the touch sensor 11. Or, the pressure detection may instead be performed before the function key detection. Then the key data and the pressure value are transmitted to the touch terminal sequentially or simultaneously.

The processor 13 may also switch the working mode of the touch sensor 11 when triggered by a switching signal. For example, a switching key is set on the pen body 1. The user can switch the touch sensor 11 to operate in a pressure detecting mode or a function key mode by pressing the switching key. The processor 13 can detect the sensing change amount of the touch sensor 11 according to the current working mode of the touch sensor 11 to correspondingly implement function key detection or pressure detection.

By using the principle that the contact area between the hand and the pen is positively correlated with the strength of the grip on the pen, providing the touch sensor in the pen body, and determining the pressure value on the pen body by the processor 13 according to the sensing change amount of the touch sensor, the cost of the active pen according to this embodiment can be reduced while the pressure detection of the active pen can be realized.

The method embodiments provided by the present disclosure are described in detail below.

Figure 7:
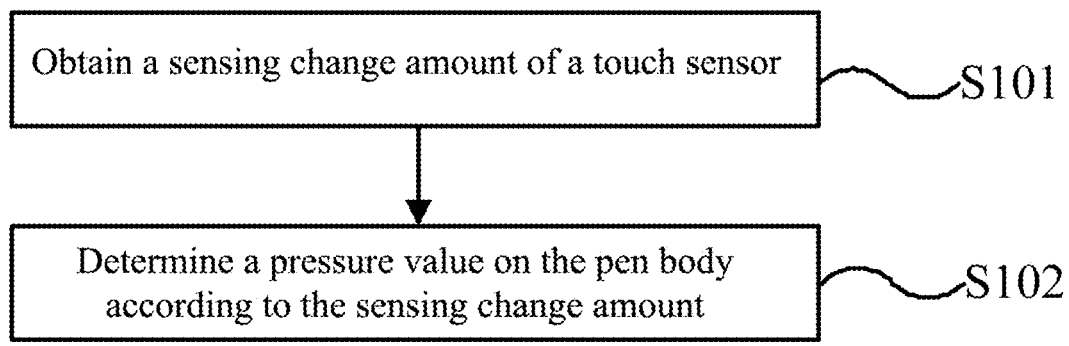
FIG. 7 is a schematic flowchart of a method for detecting a pressure of an active pen according to an embodiment of the present disclosure.

FIG. 7 is a schematic flowchart of a method for detecting a pressure of an active pen according to an embodiment of the present disclosure. As shown in FIG. 7, the method provided by this embodiment includes the following steps:

S101, obtain a sensing change amount of a touch sensor.

The sensing change amount indicates a capacitance change amount of the touch sensor.

Specifically, as described in the above embodiment, when obtaining the sensing change amount of the touch sensor, the processor in the active pen may specifically obtain the charge-discharge duration of the touch sensor, and may also obtain the amplitude of a voltage signal fed back by the touch sensor, and may also obtain other information of the touch sensor that can reflect a capacitance change amount.

Figure 8:
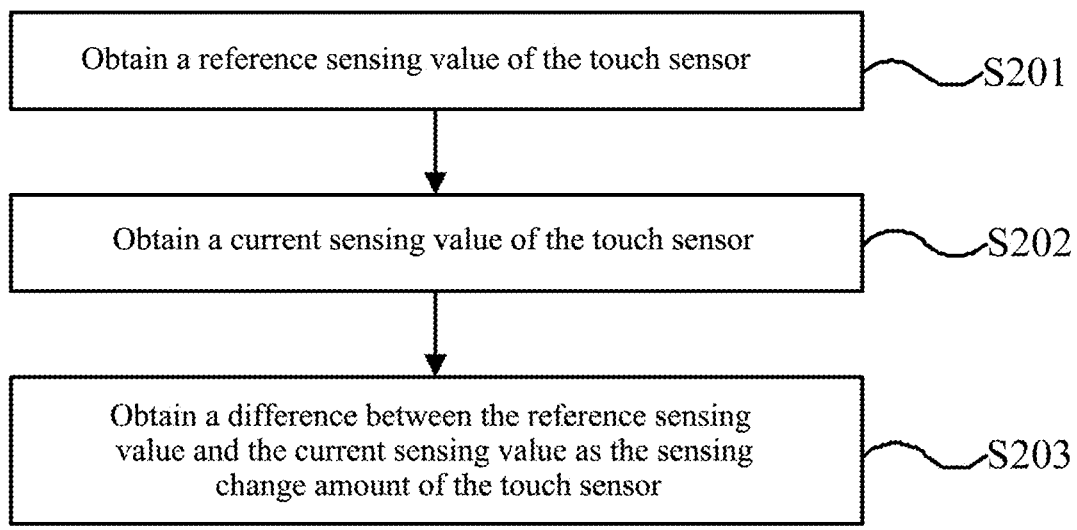
FIG. 8 is a schematic flowchart of a method for obtaining a sensing change amount of a touch sensor according to an embodiment of the present disclosure.

The obtaining the amplitude of the voltage signal fed back by the touch sensor may specifically be implemented according to the method shown in FIG. 8. FIG. 8 is a schematic flowchart of a method for obtaining a sensing change amount of a touch sensor according to an embodiment of the present disclosure. As shown in FG 8, the method may include the following steps:

S201, obtain a reference sensing value of the touch sensor.

The reference sensing value is amplitude of a voltage signal fed back by the touch sensor in response to a reference voltage signal applied thereon when the pen body is free of pressure.

Specifically, when obtaining the sensing change amount of the touch sensor, it is necessary to obtain a reference sensing value as a reference, the reference sensing value being a sensing amount of the touch sensor when the pen body is free of pressure. In this embodiment, specifically, the reference sensing value is the amplitude of the voltage signal fed back by the touch sensor in response to the reference voltage signal applied thereon when the pen body is free of pressure.

In a specific implementation, the circuits including the coding circuit, the integration circuit, and the ADC as described in the above embodiment of the active pen may be used. When the active pen is free of pressure, the reference voltage signal is applied to the touch sensor by the coding circuit, and then the charge conversion is performed by the integrating circuit, and then analog-to-digital conversion is performed by the ADC, and the amplitude of the voltage signal fed back by the touch sensor is obtained by the processor.

It should be noted that the processor cyclically detects the touch sensor according to a set detection cycle. The obtaining the sensing change amount of the touch sensor may be performed by the processor when the active pen is initially powered on, or before the pen leaves factory or during other idle times. The reference voltage signal may be applied to the touch sensor via the coding circuit, the amplitude of the voltage signal fed back by the touch sensor may be obtained, and then the amplitude may be stored as the reference sensing value of the touch sensor. The reference sensing value is retrieved to obtain the reference sensing value of the touch sensor in each detection cycle, so as to reduce the process flow for the processor.

S202, obtain a current sensing value of the touch sensor.

The current sensing value is amplitude of a voltage signal fed back by the touch sensor in response to the reference voltage signal applied thereon at a current time.

Specifically, when a user holds the pen, the capacitance of the touch sensor changes under the conductive effect of the hand, and correspondingly, the sensing amount (i.e., the current sensing value) of the touch sensor detected by the processor after the reference voltage signal is applied to the touch sensor will lower relative to the reference sensing value.

It should be noted that, as described in step S201, the processor cyclically detects the touch sensor according to the set detection cycle, and obtains the sensing change amount of the touch sensor. When no user is a pen is held currently, the current sensing value of the touch sensor detected by the processor is unchanged from the reference sensing value.

The detection cycle is determined according to the duration of the task to be processed by the processor, and the specific value is not limited in this embodiment.

In this embodiment, the touch sensor may be one or more. When there are a plurality of touch sensors, the touch sensors may be sequentially detected in one detection cycle to obtain the current sensing value of each of the touch sensors. In a specific implementation, the touch sensors may be scanned sequentially using the reference voltage signal, and the amplitude of a voltage signal fed back by each of the touch sensors is obtained as the current sensing value of each of the touch sensors.

For example, the reference voltage signal is used to scan the touch sensors, starting from the touch sensor closest to the nib to the farthest, that is, the reference voltage signal is firstly applied by the coding circuit to the first touch sensor closest to the nib shown in FIG. 1 to obtain amplitude of a voltage signal fed back by the first touch sensor; and then the reference voltage signal is applied to the second touch sensor that is second closest to the nib to obtain amplitude of a voltage signal fed back by the second touch sensor; and so on, until the amplitude of a voltage signal fed back by the last touch sensor which is farthest from the nib is obtained. Of course, the touch sensors can also be scanned in the order from the touch sensor farthest from the nib to the closest, and the specific scanning order is not particularly limited in this embodiment.

S203, obtain a difference between the reference sensing value and the current sensing value as the sensing change amount of the touch sensor.

Specifically, the sensing change amount of the touch sensor can be obtained by subtracting the current sensing value from the reference sensing value of the touch sensor.

When there are a plurality of touch sensors, the processor separately obtains the sensing change amounts of the touch sensors. For example, after the pre-stored reference sensing value of each of the touch sensors are obtained in one detection cycle, the touch sensors are sequentially detected to obtain the current sensing value of each of the touch sensors, and then the sensing change amount of each of the touch sensors is obtained.

S102, determine a pressure value on the pen body according to the sensing change amount.

Specifically, the harder the user grips the pen, the larger the contact area between the hand and the touch sensor is, and the larger the sensing change amount of the touch sensor obtained by the processor is. That is, the sensing change amount is positively correlated with the pressure received by the pen body, and the processor can determine the corresponding pressure value of the pen body according to the obtained sensing change amount.

Figure 9:
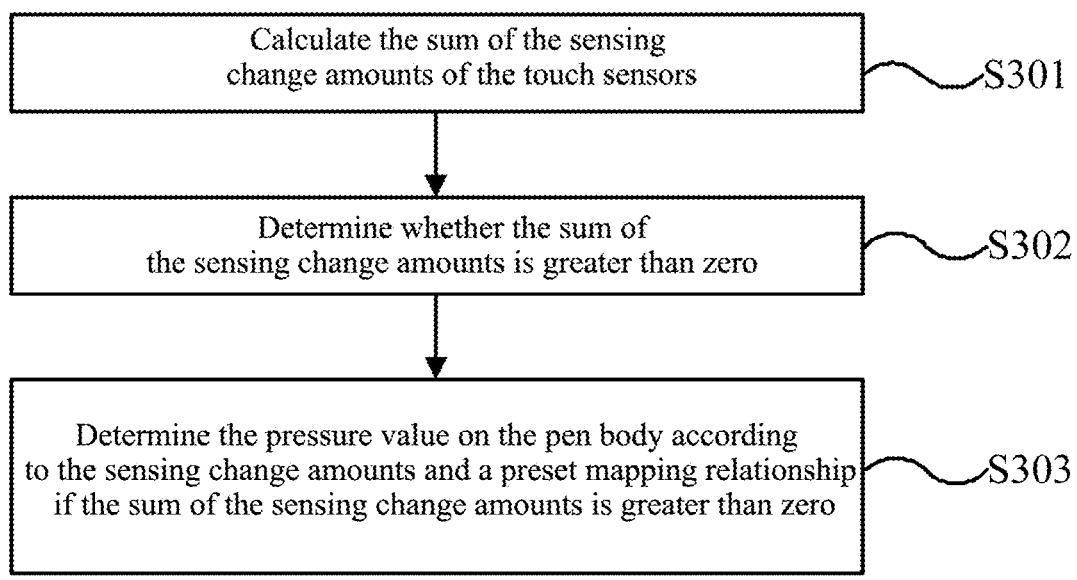
FIG. 9 is a schematic flowchart of a method for determining a pressure value in a pen body according to an embodiment of the present disclosure.

When there are a plurality of touch sensors, the pressure value on the pen body is determined according to the sensing change amounts of the plurality of touch sensors. Specifically, it can be implemented according to the method as shown in FIG. 9, which is a schematic flowchart of a method for determining a pressure value in a pen body according to an embodiment of the present disclosure. As shown in FIG. 9, the method may specifically include the following steps:

S301, calculate the sum of the sensing change amounts of the touch sensors.

Specifically, after obtaining the sensing change amount of each of the touch sensors, the sensing change amounts of the touch sensors are firstly summed up to obtain a total sensing change amount (i.e., the sum of the sensing change amounts).

S302, determine whether the sum of the sensing change amounts is greater than zero.

Specifically, after obtaining the sum of the sensing change amounts, it is determined whether the sum of the sensing change amounts is greater than zero, so as to determine whether the active pen is touched by the user. When the pen body of the active pen is touched by the user, the capacitance of at least one touch sensor in the pen body will change, and the sum of the sensing change amounts will be greater than zero. When the pen body of the active pen is not touched by the user, the capacitance of each of the touch sensors in the pen body is unchanged, and the sum of the sensing change amounts is equal to zero.

S303, determine the pressure value on the pen body according to the sensing change amounts and a preset mapping relationship if the sum of the sensing change amounts is greater than zero.

The mapping relationship includes mapping information between the pressure value and the sensing change amounts of the touch sensors.

Specifically, when the sum of the sensing change amounts is greater than zero, it indicates that the user is touching the pen body of the active pen and applying a certain pressure to the pen body. At this time, the pressure value on the pen body can be determined according to the sensing change amounts of the touch sensors and the preset mapping relationship.

Since the mapping relationship between the pressure value and the sensing change amounts of the touch sensors is nonlinear, when the mapping relationship is specifically determined, the mapping information between the pressure value and the sensing change amounts of the touch sensors can be obtained as much as possible by measurement (referred to as pressure-sensing change data). Then, more multitudes of pressure-sensing change data can be obtained through a difference algorithm, and a table can be created and stored in the active pen. When the sum of the sensing change amounts is greater than zero, the pressure value on the pen body can be determined by looking up the table.

In the method, the sum of the sensing change amounts of the touch sensors are firstly calculated, and the pressure value on the pen body is determined according to the sensing change amounts and the preset mapping relationship when the sum of the sensing change amounts is greater than zero. Thus, table look-up operation can be reduced, and processing efficiency of the processor can be improved.

After determining the pressure value on the pen body, the processor may transmit the pressure value to the touch terminal via a wire or wirelessly. The touch terminal can display the thickness of the handwriting according to the pressure value after receiving the pressure value.

In addition, in this embodiment, the working state of the active pen can be determined according to the detected pressure value.

Specifically, the active pen can be controlled to enter a sleep-low-power state when the duration of the pressure value being smaller than a first pressure threshold is greater than a preset time threshold; and the active pen can be waked up from the sleep-low-power state to a normal working state when the pressure value is greater than a second pressure threshold.

The first pressure threshold and the second pressure threshold may be the same or different. The specific magnitude of the first pressure threshold and the second pressure threshold may be set according to actual conditions, and will not be limited in this embodiment. The preset time threshold may be selected as a slightly extended period of time, for example, 5 seconds, and the specific value of which is again not particularly limited in this embodiment.

In different environments, the sensing value of the touch sensor may be different. In this embodiment, each time the active pen is powered on or sleeping (i.e., enters the sleep-low-power state), the reference voltage signal can be applied to the touch sensor by the coding circuit, and the amplitude of the voltage signal fed back by the touch sensor can be obtained (i.e., the current sensing value of the touch sensor is obtained), and the pre-stored reference sensing value of the touch sensor can be updated according to the amplitude. Thus, the influence of the environment and the like on the reference sensing value of the touch sensor can be avoided, and the accuracy of the pressure detection result can be improved.

When the active pen is free of pressure, the reference sensing value of the touch sensor has less variation in different environments. In order to improve the accuracy of the update result, in a specific implementation, the difference between the current sensing value and the pre-stored reference sensing value may be determined first, then the reference sensing value of the touch sensor is updated according to the difference value, so as to avoid updating the reference sensing value of the touch sensor with an abnormal current sensing value, which might have been caused by an abnormality in the active pen or other reasons and may affect the accuracy of the update result.

Specifically, one can determine whether the absolute value of the difference between the current sensing value and the pre-stored reference sensing value is smaller than a preset sensing threshold. When the absolute value of the difference between the current sensing value and the pre-stored reference sensing value is smaller than the preset sensing threshold, the pre-stored reference sensing value of the touch sensor is updated with the current sensing value. Otherwise, the pre-stored reference sensing value of the touch sensor is kept unchanged.

By obtaining the reference sensing value of the touch sensor in the pen body and determining the pressure value on the pen body according to the sensing change amount, the method for detecting a pressure of the active pen according to this embodiment of the present disclosure can reduce the cost of the active pen while realizing the pressure detection of the active pen.

Figure 10:
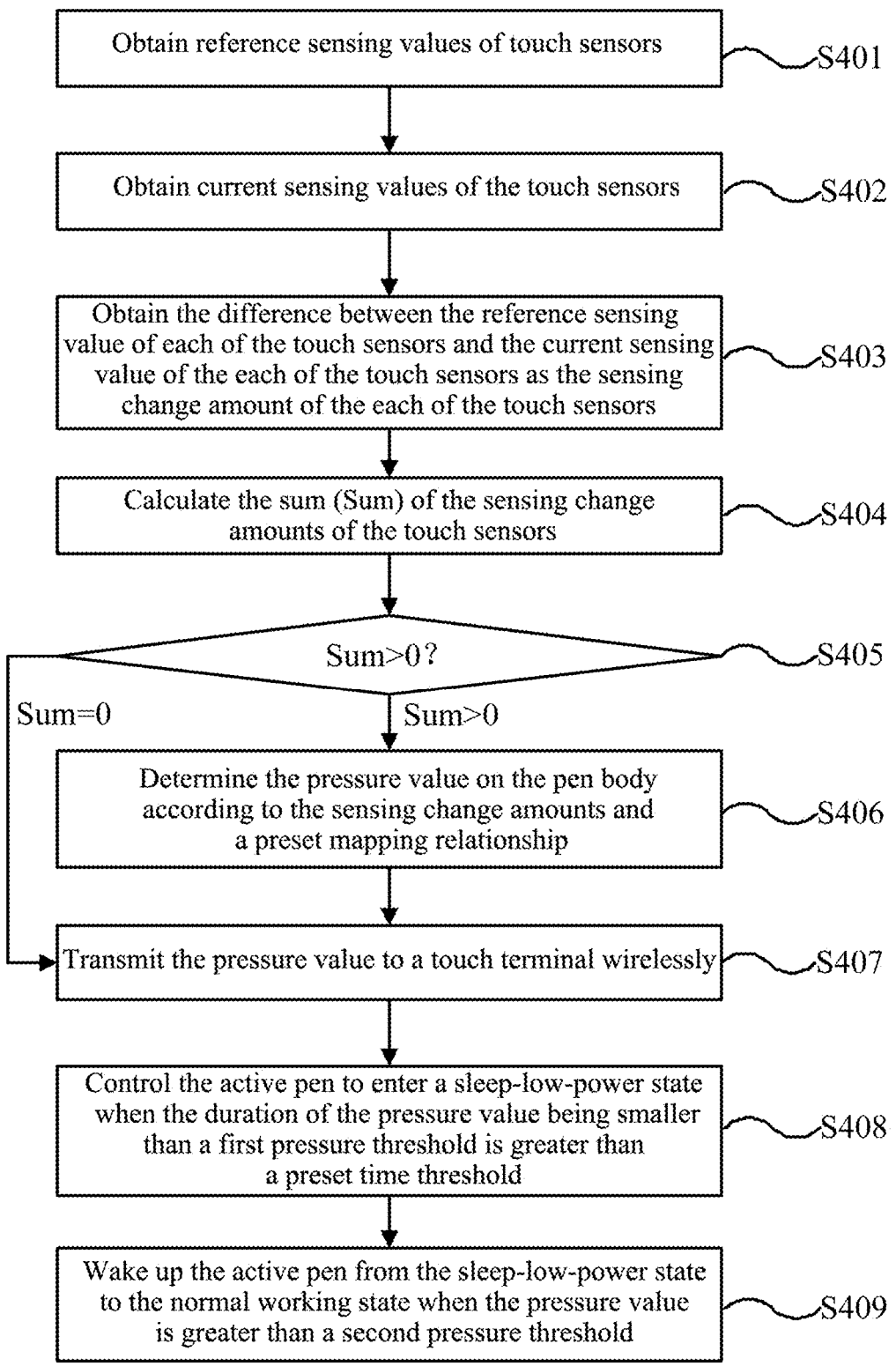
FIG. 10 is a schematic flowchart of another method for detecting a pressure of an active pen according to an embodiment of the present disclosure.

FIG. 10 is a schematic flowchart of another method for detecting a pressure of an active pen according to an embodiment of the present disclosure. This embodiment is another specific implementation of the embodiment as shown in FIG. 7, on the basis of which, as shown in FIG. 10, the method provided by this embodiment may include the following steps:

S401, obtain reference sensing values of touch sensors.

Specifically, when there are a plurality of touch sensors, the processor obtains the reference sensing values of the touch sensors when detecting the touch sensors. For the specific method for obtaining the reference sensing value of each of the touch sensors, reference may be made to the above step S201, which will not be repeated herein.

S402, obtain current sensing values of the touch sensors.

Specifically, in each detection cycle, the processor obtains the current sensing value of each of the touch sensors, respectively. The specific method for obtaining the current sensing value of each of the touch sensors can be seen by referring to the above step S202, the details of which are not described herein again.

S403, obtain the difference between the reference sensing value of each of the touch sensors and the current sensing value of the each of the touch sensors as the sensing change amount of the each of the touch sensors.

Specifically, after obtaining the current sensing values of the touch sensors, for each touch sensor, the sensing change amount of the touch sensor can be obtained by subtracting the current sensing value from the reference sensing value.

S404, calculate the sum (Sum) of the sensing change amounts of the touch sensors.

Specifically, after obtaining the sensing change amount of each of the touch sensors, a total sensing change amount (the sum of the sensing change amounts, Sum) can be obtained by summing the sensing change amounts of the touch sensors.

S405, determine whether the sum of the sensing change amounts is greater than zero; if the sum of the sensing change amounts (Sum) is greater than zero (Sum>0), then the step S406 is performed; if the sum of the sensing change amounts is equal to zero (Sum=0), then the step S407 is performed.

Specifically, after obtaining the sum of the sensing change amounts (Sum), whether the sum of the sensing change amounts (Sum) is greater than zero is determined, so as to determine whether the active pen is being touched by the user. Under normal circumstance, the sum of the sensing change amounts (Sum) is greater than or equal to zero. When the sum of the sensing change amounts (Sum) is greater than zero, it indicates that the capacitance of at least one touch sensor in the pen body is changed, and the pen body of the active pen is being touched by the user. When the sum of the sensing change amounts (Sum) equals to zero, it indicates that the capacitance of the touch sensors in the pen body is unchanged, and the pen body of the active pen is not touched by the user. When the sum of the sensing change amounts (Sum) is smaller than zero, it is an abnormal circumstance, for which the processor can perform exception processing, which is not specifically limited in this embodiment.

S406, determine the pressure value on the pen body according to the sensing change amounts and a preset mapping relationship.

For the specific description of the step, reference can be made to the above step S303, which will not be repeated herein.

S407, transmit the pressure value to a touch terminal wirelessly.

Specifically, when the sum of the sensing change amounts is greater than zero (i.e., the pressure value is greater than zero) or when the sum of the sensing change amounts equals to zero (i.e., the pressure value equals to zero), the processor transmits the pressure value to the touch terminal wirelessly. The touch terminal can display the thickness of the handwriting according to the pressure value after receiving the pressure value.

When the active pen is a wireless active pen, transmitting the pressure value to the touch terminal wirelessly can prevent the nib of the active pen from scratching the touch screen when writing on the touch screen of the touch terminal.

S408, control the active pen to enter a sleep-low-power state when the duration of the pressure value being smaller than a first pressure threshold is greater than a preset time threshold.

Specifically, if the internal components of the active pen remain in a working state when the active pen is not used, the power consumption will be relatively high, which affects the battery life of the active pen. In this embodiment, when the duration of the pressure value being smaller than the first pressure threshold is greater than the preset time threshold, the active pen is controlled to enter the sleep-low-power state from the normal working state, so as to reduce the power consumption of the active pen and extend the battery life of the active pen.

A smaller value can be selected as the first pressure value, and the specific value can be set according to the actual situation, which is not specifically limited in this embodiment.

When the active pen enters the sleep-low-power state, the circuits (such as a track detection circuit and a radio circuit, etc.) that are not related to the wake-up function in the active pen can be turned off, leaving only the circuit related to the wake-up function on.

S409, wake up the active pen from the sleep-low-power state to the normal working state when the pressure value is greater than a second pressure threshold.

Specifically, when the active pen is in use again, the pressure value will increase. At this time, by determining the magnitude of the pressure value and waking up the active pen when the pressure value is greater the second pressure threshold, the active pen can enter the normal working state from the sleep-low-power state.

The second pressure value and the first pressure value may be the same or different, and the specific value can be set according to the actual situation, which is not specifically limited in this embodiment.

It should be noted that there is no strict timing relationship between steps S408, S409 and step S407. Steps S408 and S409 may be performed after or before or simultaneously with step S407, the specific performing sequence will not be particularly limited in this embodiment. Similarly, nor is there any strict timing relationship between the steps S408 and S409, the specific performing sequence will not be specifically limited in this embodiment.

By obtaining the reference sensing values of the plurality of touch sensors in the pen body and determining the pressure value on the pen body according to the plurality of sensing change amounts, the method for detecting a pressure of an active pen provided by this embodiment can improve the sensitivity of the pressure detection of the active pen. In addition, by transmitting the pressure value to the touch terminal wirelessly, the wireless active pen can implement the pressure detection of the active pen and prevent the nib of the wireless active pen from scratching the touch screen when writing on the touch screen of the touch terminal.

Figure 11:
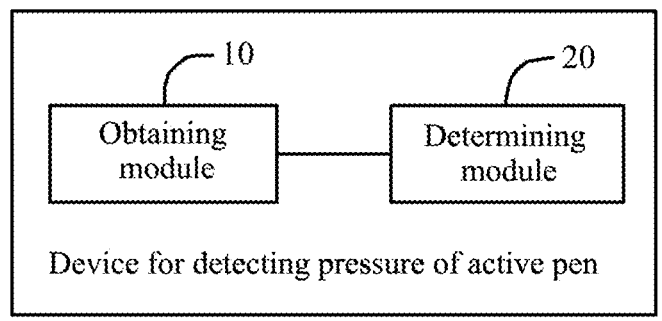
FIG. 11 is a schematic structural diagram of a device for detecting a pressure of an active pen according to an embodiment of the present disclosure.

FIG. 11 is a schematic structural diagram of a device for detecting a pressure of an active pen according to an embodiment of the present disclosure. Touch sensors are provided in the pen body of the active pen of this embodiment. As shown in FIG. 11, the device provided by this embodiment includes:

an obtaining module 10, configured to obtain a sensing change amount of the touch sensor, where the sensing change amount is used to indicate a capacitance change amount of the touch sensor; and a determining module 20, configured to determine, according to the sensing change amount obtained by the obtaining module 10, a pressure value received by the pen body.

Specifically, the device for detecting a pressure of an active pen in this embodiment may be a separate device and/or structure provided in the active pen, or may be integrated therein.

As an optional implementation of this embodiment, there may be more than one touch sensors, and the obtaining module 10 is specifically configured to:

obtain the sensing change amount of each of the touch sensors separately.

The device provided in this embodiment can perform the above method embodiments, and the implementation principle and technical effects are similar, which will not be repeated herein.

Figure 12:
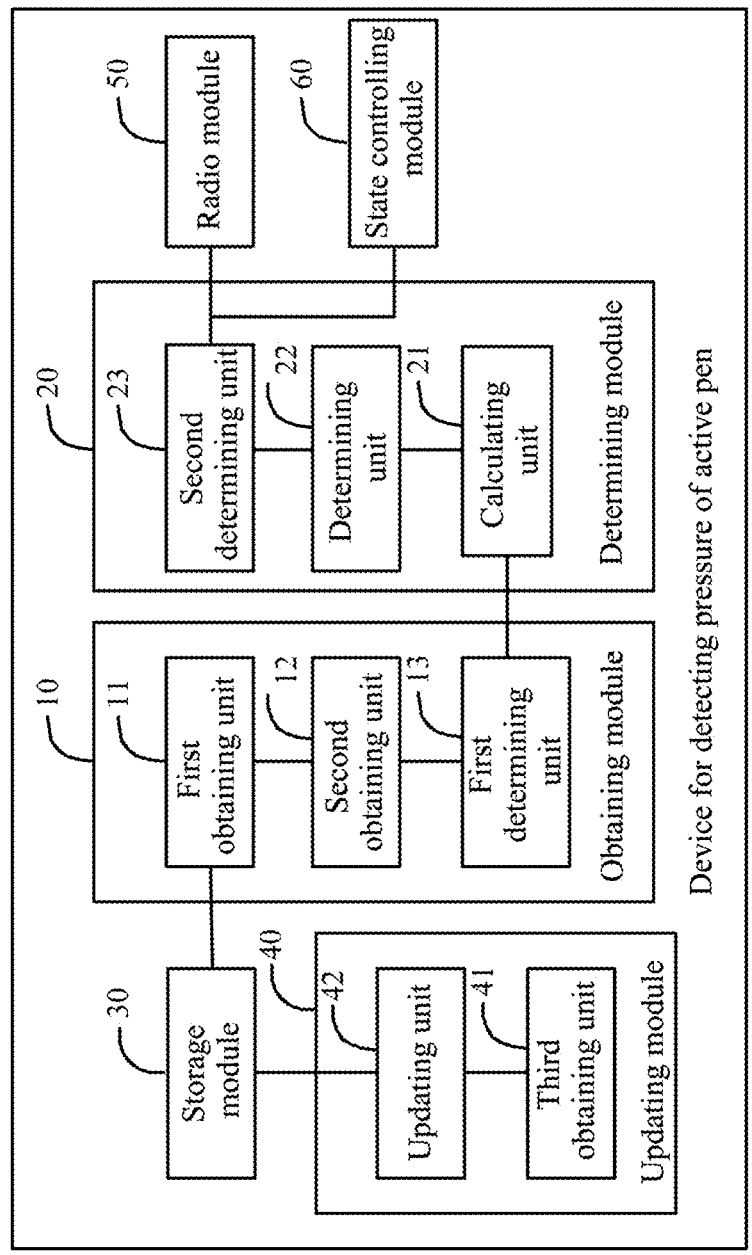
FIG. 12 is a schematic structural diagram of another device for detecting a pressure of an active pen according to an embodiment of the present disclosure.

FIG. 12 is a schematic structural diagram of another device for detecting a pressure of an active pen according to an embodiment of the present disclosure. This embodiment is a further optimization and supplement to the embodiment shown in FIG. 11. Based on the embodiment shown in FIG. 11, as shown in FIG. 12, in the device provided by this embodiment, the obtaining module 10 includes:

a first obtaining unit 11, configured to obtain a reference sensing value of the touch sensor, where the reference sensing value is amplitude of a voltage signal fed back by the touch sensor in response to a reference voltage signal applied thereon when the pen body is free of pressure;

a second obtaining unit 12, configured to obtain a current sensing value of the touch sensor, where the current sensing value is amplitude of a voltage signal fed back by the touch sensor in response to the reference voltage signal applied thereon at a current time; and a first determining unit 13, configured to obtain a difference between the reference sensing value obtained by the first obtaining unit 11 and the current sensing value obtained by the second obtaining unit 12 as the sensing change amount of the touch sensor.

As an optional implementation of this embodiment, the device may further include: a storage module 30, configured to pre-store a reference sensing value of the touch sensor; and the first obtaining unit 11 is specifically configured to:

obtain the reference sensing value of the touch sensor pre-stored in the storage module 30.

As another optional implementation of this embodiment, the device may further include:

an updating module 40, configured to update the reference sensing value of the touch sensor pre-stored in the storage module 30 when the active pen is powered on or sleeping.

As a specific implementation of this embodiment, the updating module 40 may include:

a third obtaining unit 41, configured to obtain the current sensing value of the touch sensor; and an updating unit 42, configured to update the reference sensing value of the touch sensor pre-stored in the storage module 30 with the current sensing value when an absolute value of the difference between the current sensing value obtained by the third obtaining unit 41 and the reference sensing value pre-stored in the storage module 30 is smaller than a preset sensing threshold.

As another specific implementation of this embodiment, there are a plurality of touch sensors, and the second obtaining unit 12 is specifically configured to:

scan each of the touch sensors sequentially using the reference voltage signal, and obtain amplitude of a voltage signal fed back by each of the touch sensors.

As an optional implementation of this embodiment, the determining module 20 may include:

a calculating unit 21, configured to calculate a sum of sensing change amounts of the touch sensors;

a determining unit 22, configured to determine whether the sum of the sensing change amounts as calculated by the calculating unit 21 is greater than zero; and a second determining unit 23, configured to determine the pressure value on the pen body according to the sensing change amounts and a preset mapping relationship if the determining unit 22 determines that the sum of the sensing change amounts is greater than zero, where the mapping relationship includes mapping information between the pressure value and the sensing change amounts of the touch sensors.

As an optional implementation of this embodiment, the device may further include:

a radio module 50, configured to transmit the pressure value determined by the determining module 20 to a touch terminal wirelessly.

As another optional implementation of this embodiment, the device may further include:

a state controlling module 60, configured to control the active pen to enter a sleep-low-power state when the determining module 20 determines that a duration of the pressure value being smaller than a first pressure threshold is greater than a preset time threshold; and wake up the active pen from the sleep-low-power state to a normal working state when the determining module 20 determines that the pressure value is greater than a second pressure threshold.

The device provided in this embodiment can perform the above method embodiments, and the implementation principle and technical effects are similar, which will not be repeated herein.

An embodiment of the present disclosure further provides a touch input system, including: a touch terminal and the active pen in the embodiment shown in above FIG. 1.

An embodiment of the present disclosure further provides a computer readable storage medium having a computer program stored thereon which, when executed by the processor, implements the method according to any one of the above method embodiments.

Finally, it should be noted that the above embodiments are only used to illustrate, rather than to limit, the technical solutions of the present disclosure. Although the present disclosure has been described in detail with reference to the foregoing embodiments, those skilled in the art will understand that the technical solutions described in the foregoing embodiments may be modified, or some or all of the technical features may be equivalently replaced; and the modifications or substitutions do not cause the essence of the corresponding technical solution to deviate from the scope of the technical solutions of the embodiments of the present disclosure.

What is claimed is:

1. A method for detecting a pressure of an active pen, a pen body of the active pen being provided with a touch sensor, wherein the method comprises:

obtaining a sensing change amount of the touch sensor, wherein the sensing change amount is used to indicate a capacitance change amount of the touch sensor, and the sensing change amount is positively correlated with a contact area between the pen body and a hand;

determining, according to the sensing change amount, a pressure value received by the pen body; and transmitting the pressure value to a touch terminal, via a wire or wirelessly, to enable the touch terminal to display a thickness of a handwriting according to the pressure value.

2. The method according to claim 1, wherein the obtaining a sensing change amount of the touch sensor comprises:

obtaining a reference sensing value of the touch sensor, wherein the reference sensing value is amplitude of a voltage signal fed back by the touch sensor in response to a reference voltage signal applied thereon when the pen body is free of pressure;

obtaining a current sensing value of the touch sensor, wherein the current sensing value is amplitude of a voltage signal fed back by the touch sensor in response to the reference voltage signal applied thereon at a current time; and obtaining a difference between the reference sensing value and the current sensing value as the sensing change amount of the touch sensor.

3. The method according to claim 2, wherein the obtaining a reference sensing value of the touch sensor comprises:

obtaining a pre-stored reference sensing value of the touch sensor.

4. The method according to claim 3, wherein the method further comprises:

updating the pre-stored reference sensing value of the touch sensor when the active pen is powered on or sleeping, wherein the updating the pre-stored reference sensing value of the touch sensor comprises:

obtaining the current sensing value of the touch sensor; and updating the pre-stored reference sensing value of the touch sensor with the current sensing value when an absolute value of a difference between the current sensing value and the pre-stored reference sensing value is smaller than a preset sensing threshold.

5. The method according to claim 2, wherein there are a plurality of touch sensors, and the obtaining the current sensing value of the touch sensor comprises:

scanning each of the touch sensors sequentially using the reference voltage signal, and obtaining amplitude of a voltage signal fed back by each of the touch sensors.

6. An active pen, comprising a pen body and a nib, wherein the pen body is provided with a touch sensor, and the active pen further comprises: a memory and a processor, wherein:

the memory is configured to store executable instructions; and the processor is configured to implement the method according to claim 1 when executing the executable instructions.

7. The active pen according to claim 6, wherein there are a plurality of touch sensors, and the plurality of the touch sensors are located at an end of the pen body near the nib, and are axially spaced along the pen body, wherein each of the touch sensor is a ring electrode, the ring electrode being disposed coaxially with the pen body.

8. The active pen according to claim 6, wherein the active pen further comprises: a radio circuit, wherein the radio circuit is electrically connected to the processor, and configured to transmit the pressure value to a touch terminal wirelessly according to an instruction of the processor.

9. A touch input system, comprising: a touch terminal and the active pen according to claim 6.

10. The method according to claim 1, wherein there are a plurality of touch sensors, and the obtaining a sensing change amount of the touch sensor comprises:

obtaining the sensing change amount of each of the touch sensors separately, wherein the determining, according to the sensing change amount, a pressure value received by the pen body comprises:

calculating a sum of sensing change amounts of the touch sensors;

determining whether the sum of the sensing change amounts is greater than zero; and determining the pressure value on the pen body according to the sensing change amounts and a preset mapping relationship if the sum of the sensing change amounts is greater than zero, wherein the mapping relationship comprises mapping information between the pressure value and the sensing change amounts of the touch sensors.

11. The method according to claim 1, wherein the method further comprises:

controlling the active pen to enter a sleep-low-power state when a duration of the pressure value being smaller than a first pressure threshold is greater than a preset time threshold; and waking up the active pen from the sleep-low-power state to a normal working state when the pressure value is greater than a second pressure threshold.

12. A device for detecting a pressure of an active pen, a pen body of the active pen being provided with a touch sensor, wherein the device comprises a processor configured to:

obtain a sensing change amount of the touch sensor, wherein the sensing change amount is used to indicate a capacitance change amount of the touch sensor, and the sensing change amount is positively correlated with a contact area between the pen body and a hand; and determine, according to the sensing change amount obtained by the processor, a pressure value received by the pen body, wherein the device further comprises:

a radio circuit, configured to transmit the pressure value determined by the processor to a touch terminal, via a wire or wirelessly, to enable the touch terminal to display a thickness of a handwriting according to the pressure value.

13. The device according to claim 12, wherein the processor is further configured to:

obtain a reference sensing value of the touch sensor, wherein the reference sensing value is amplitude of a voltage signal fed back by the touch sensor in response to a reference voltage signal applied thereon when the pen body is free of pressure;

obtain a current sensing value of the touch sensor, wherein the current sensing value is amplitude of a voltage signal fed back by the touch sensor in response to the reference voltage signal applied thereon at a current time; and obtain a difference between the reference sensing value obtained by the processor and the current sensing value obtained by the processor as the sensing change amount of the touch sensor.

14. The device according to claim 13, wherein the device further comprises: a memory, configured to pre-store a reference sensing value of the touch sensor; and the processor is further configured to:

obtain the reference sensing value of the touch sensor pre-stored in the memory.

15. The device according to claim 14, wherein the processor is further configured to:

update the reference sensing value of the touch sensor pre-stored in the memory when the active pen is powered on or sleeping, obtain the current sensing value of the touch sensor; and update the reference sensing value of the touch sensor pre-stored in the memory with the current sensing value when an absolute value of the difference between the current sensing value obtained by the processor and the reference sensing value pre-stored in the memory is smaller than a preset sensing threshold.

16. The device according to claim 13, wherein there are a plurality of touch sensors, and the processor is specifically further configured to:

scan each of the touch sensors sequentially using the reference voltage signal, and obtain amplitude of a voltage signal fed back by each of the touch sensors.

17. The device according to claim 12, wherein there are a plurality of touch sensors, and the processor is further configured to:

obtain the sensing change amount of each of the touch sensors separately, wherein the processor is further configured to:

calculate a sum of sensing change amounts of the touch sensors;

determine whether the sum of the sensing change amounts as calculated by the processor is greater than zero; and determine the pressure value on the pen body according to the sensing change amounts and a preset mapping relationship if the processor determines that the sum of the sensing change amounts is greater than zero, wherein the mapping relationship comprises mapping information between the pressure value and the sensing change amounts of the touch sensors.

18. The device according to claim 12, wherein the processor is further configured to:

control the active pen to enter a sleep-low-power state when the processor determines that a duration of the pressure value being smaller than a first pressure threshold is greater than a preset time threshold; and wake up the active pen from the sleep-low-power state to a normal working state when the processor determines that the pressure value is greater than a second pressure threshold.

19. A device for detecting a pressure of an active pen, a pen body of the active pen being provided with a touch sensor, wherein the device comprises a processor configured to:
  obtain a sensing change amount of the touch sensor, wherein the sensing change amount is used to indicate a capacitance change amount of the touch sensor, and the sensing change amount is positively correlated with a contact area between the pen body and a hand; and
  determine, according to the sensing change amount obtained by the processor, a pressure value received by the pen body;
  wherein there are a plurality of touch sensors, and the processor is further configured to:
  obtain the sensing change amount of each of the touch sensors separately,
  wherein the processor is further configured to:
    calculate a sum of sensing change amounts of the touch sensors;
    determine whether the sum of the sensing change amounts as calculated by the processor is greater than zero; and
    determine the pressure value on the pen body according to the sensing change amounts and a preset mapping relationship if the processor determines that the sum of the sensing change amounts is greater than zero, wherein the mapping relationship comprises mapping information between the pressure value and the sensing change amounts of the touch sensors.

20. The device according to claim 19, wherein the processor is further configured to:
  obtain a reference sensing value of the touch sensor, wherein the reference sensing value is amplitude of a voltage signal fed back by the touch sensor in response to a reference voltage signal applied thereon when the pen body is free of pressure;
  obtain a current sensing value of the touch sensor, wherein the current sensing value is amplitude of a voltage signal fed back by the touch sensor in response to the reference voltage signal applied thereon at a current time; and
  obtain a difference between the reference sensing value obtained by the processor and the current sensing value obtained by the processor as the sensing change amount of the touch sensor.

\* \* \* \* \*